(12) United States Patent
    Reardon

(10) Patent No.: US 11,453,326 B2
(45) Date of Patent: Sep. 27, 2022

(54) TIE DOWN APPARATUS AND SYSTEM

(71) Applicant: Anthony Reardon, Brisbane (AU)

(72) Inventor: Anthony Reardon, Brisbane (AU)

( * ) Notice: Subject to any disclaimer, the term of this patent is extended or adjusted under 35 U.S.C. 154(b) by 234 days.

(21) Appl. No.: 16/988,132

(22) Filed: Aug. 7, 2020

(65) Prior Publication Data

US 2021/0039546 A1    Feb. 11, 2021

(30) Foreign Application Priority Data

Aug. 9, 2019    (AU) .............................. 2019213432

(51) Int. Cl.
    *B60P 7/08*    (2006.01)
(52) U.S. Cl.
    CPC .......... *B60P 7/0815* (2013.01); *B60P 7/0838* (2013.01)
(58) Field of Classification Search
    CPC ...................................................... B61D 45/00
    USPC ....... 410/104, 12, 34, 97, 106, 98, 100, 103, 410/105
    See application file for complete search history.

(56) References Cited

U.S. PATENT DOCUMENTS

| | | | |
|---|---|---|---|
| 5,186,586 A * | 2/1993 | Stephenson, Jr. ....... | B60P 7/083 410/103 |
| 7,094,014 B1 * | 8/2006 | Qualls .................. | B61D 45/001 410/100 |
| 8,025,469 B2 * | 9/2011 | Ruan ..................... | B60P 7/083 410/103 |
| 8,647,034 B2 * | 2/2014 | Villalon-Regalado ...... | B60P 7/083 410/103 |

* cited by examiner

*Primary Examiner* — D Glenn Dayoan
*Assistant Examiner* — Sunsurraye Westbrook
(74) *Attorney, Agent, or Firm* — The Webb Law Firm

(57) ABSTRACT

A tie down system having a first attachment member having an engagement portion adapted to engage with a portion of a track, a second attachment member having an engagement portion adapted to engage with a portion of the track, the second attachment member rotatably attached relative to the first attachment member, a cam member rotatably attached relative to the first attachment member, and rotatable between a biased position in which the cam member engages with a portion of the track and a release position in which the cam member is disengaged from the track, and a connection portion adapted to connect to a strap, wherein the first and second attachment members are rotatable relative to each other between an engagement position in which the engagement portions engage with the track and inhibit movement of the attachment members relative to the track, and an open position in which the attachment members are movable relative to the track.

20 Claims, 2 Drawing Sheets

TIE DOWN APPARATUS AND SYSTEM

CROSS-REFERENCE TO RELATED APPLICATION

This application claims priority to Australian Patent Application No. 2019213432 filed Aug. 9, 2019, the disclosure of which is hereby incorporated by reference in its entirety.

FIELD OF INVENTION

The present invention relates to a tie down apparatus and system. The present invention has particular but not exclusive application for providing tie down points on vehicles. The patent specification describes this use but it is by way of example only and the invention is not limited to this use.

BACKGROUND OF THE INVENTION

When carrying large items on trailers or vehicle trays it is often necessary to secure these items to prevent them from moving or falling off during sudden movement.

Larger items are typically tied down on trailers and in vehicle trays using tie down straps. The tie down straps are typically ratchet straps attached to hooks and are rated at hundreds of kilograms to multiple tonnes. The hooks are typically attached to rails such as metal bars, or to eyelets associated with the trailer or vehicle.

A problem with attaching a hook to a rail is that the position of the hook can change if there is some slack on the hook.

A problem with attaching a hook to an eyelet is that the position of the hook cannot be easily changed. If the position of a hook needs to be changed, it can only be changed to the position of another eyelet.

One adequate prior art solution uses a rail with indentations so that a hook can be placed at a desired location along the rail.

OBJECT OF THE INVENTION

It is an object of the present invention to overcome or at least alleviate one or more of the above mentioned problems with tie down systems and/or provide the consumer with a useful or commercial choice.

SUMMARY OF THE INVENTION

In one aspect, the present invention broadly resides in a tie down system having
a first attachment member having an engagement portion adapted to engage with a portion of a track;
a second attachment member having an engagement portion adapted to engage with a portion of the track, the second attachment member rotatably attached relative to the first attachment member;
a cam member rotatably attached relative to the first attachment member, and rotatable between a biased position in which the cam member engages with a portion of the track and a release position in which the cam member is disengaged from the track; and
a connection portion adapted to connect to a strap,
wherein the first and second attachment members are rotatable relative to each other between an engagement position in which the engagement portions engage with the track and inhibit movement of the first and second attachment members relative to the track, and an open position in which the first and second attachment members are movable relative to the track, and wherein the cam member in the biased position biases the first and second attachment members to the engagement position, and when the cam member is in the release position, the first and second attachment members are movable to the open position.

Preferably, the first attachment member is made of metal plate material. More preferably the first attachment member is made of steel plate. Preferably the engagement portion of the first attachment member is an arcuate portion of the first attachment member. Preferably the engagement portion is adapted to engage with a flange portion of a track. Preferably, when the first and second attachment members are in the open position, the engagement portion is adapted to slide along the flange portion of the track. Preferably the first attachment member is rotatably attached to the connection portion.

Preferably, the second attachment member is made of metal plate material. More preferably the second attachment member is made of steel plate. Preferably the engagement portion of the second attachment member is an arcuate portion of the second attachment member. Preferably the engagement portion is adapted to engage with a flange portion of a track. Preferably, when the first and second attachment members are in the open position, the engagement portion is adapted to slide along the flange portion of the track. Preferably the second attachment member is rotatably attached to the connection portion.

Preferably the cam member is made of metal plate material. More preferably the cam member is made of steel plate. Preferably as the cam moves from the release position to the biased position it moves past an over centre position so that the cam member is biased into the biased position. Preferably in the biased position, the cam member is securable to the first attachment member. Preferably the cam member is rotatably attached to the connection portion. In one embodiment, the cam member is biased into the biased position. Preferably the cam member is biased into the biased position by one or more springs.

Preferably the tie down system further includes a second cam member associated with the cam member. Preferably the cam member is located towards a first end of the tie down system and the second cam member is located towards an opposed end of the tie down system. Preferably the second cam member moves with the cam member. Preferably the second cam member is rotatable between a biased position in which the second cam member engages with a portion of the track and a release position in which the second cam member disengages from the track, in a similar manner as the cam member. In one embodiment, the second cam member is biased into the biased position. Preferably the second cam member is biased into the biased position by one or more springs.

Preferably a lock bar extends between the cam member and the second cam member. Preferably the lock bar is movable between a locked and unlocked position. Preferably the lock bar is biased towards the locked position. Preferably the lock bar is biased towards the locked position by one or more springs. Preferably the one or more springs are connected to the lock bar and to the connection member. Preferably when the cam member is in the biased position and when the lock bar is in the locked position, the lock bar engages with the first attachment member to secure the cam member relative to the first attachment member. Preferably the second cam member is rotatably attached to the connection portion.

Preferably the connection portion is a connecting rod. Preferably the first attachment member is rotatably attached to the connecting rod. Preferably the second attachment member is rotatably attached to the connecting rod. Preferably the cam member is rotatably attached to the connecting rod. Preferably at least two of the first attachment member, the second attachment member and the cam member are rotatably attached to the connecting rod. In one embodiment, one of the first attachment member, the second attachment member or the cam member is fixedly attached to the connecting rod.

Preferably the tie down system includes the track. The track is preferably a 'T' shaped track. The track preferably includes two opposed flange portions. Preferably the engagement portions of the first and second attachment member are adapted to engage with corresponding flange portions. Preferably the track includes a centrally recessed portion. Preferably the centrally recessed portion includes an abutment member. Preferably in the biased position the cam member engages with the abutment member. Preferably the abutment member is made of a flexible material. Preferably the abutment member is made of a resilient material.

In another aspect, the present invention broadly resides in a tie down apparatus having a first attachment member having an arcuate engagement portion adapted to engage with a flange portion of a track;

a second attachment member having an arcuate engagement portion adapted to engage with a flange portion of the track, the second attachment member rotatably attached relative to the first attachment member;

a cam member rotatably attached relative to the first attachment member, and rotatable between a biased position in which the cam member engages with a portion of the track and a release position in which the cam member is disengaged from the track; and a connecting rod adapted to connect to a strap, wherein the first and second attachment members are rotatable relative to each other between an engagement position in which the engagement portions engage with the track and inhibit movement of the first and second attachment members relative to the track, and an open position in which the first and second attachment members are movable relative to the track, and wherein the cam member in the biased position biases the first and second attachment members to the engagement position, and when the cam member is in the release position, the first and second attachment members are movable to the open position, and wherein the first attachment member, the second attachment member and the cam member are rotatably attached to each other by the connection rod.

Preferably the tie down apparatus is a tie down system as described in this specification.

In a further aspect, the present invention broadly resides in a method of securing a strap to a track, including the steps of moving a tie down apparatus as described in this specification along a track to a desired location;

moving the cam member to the biased position to bias the first and second attachment members to the engagement position to inhibit movement of the first and second attachment members relative to the track.

Preferably the method further includes the step of securing the cam member in the biased position to the first attachment member.

The features described with respect to one aspect also apply where applicable to all other aspects of the invention.

Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

Figure 1:
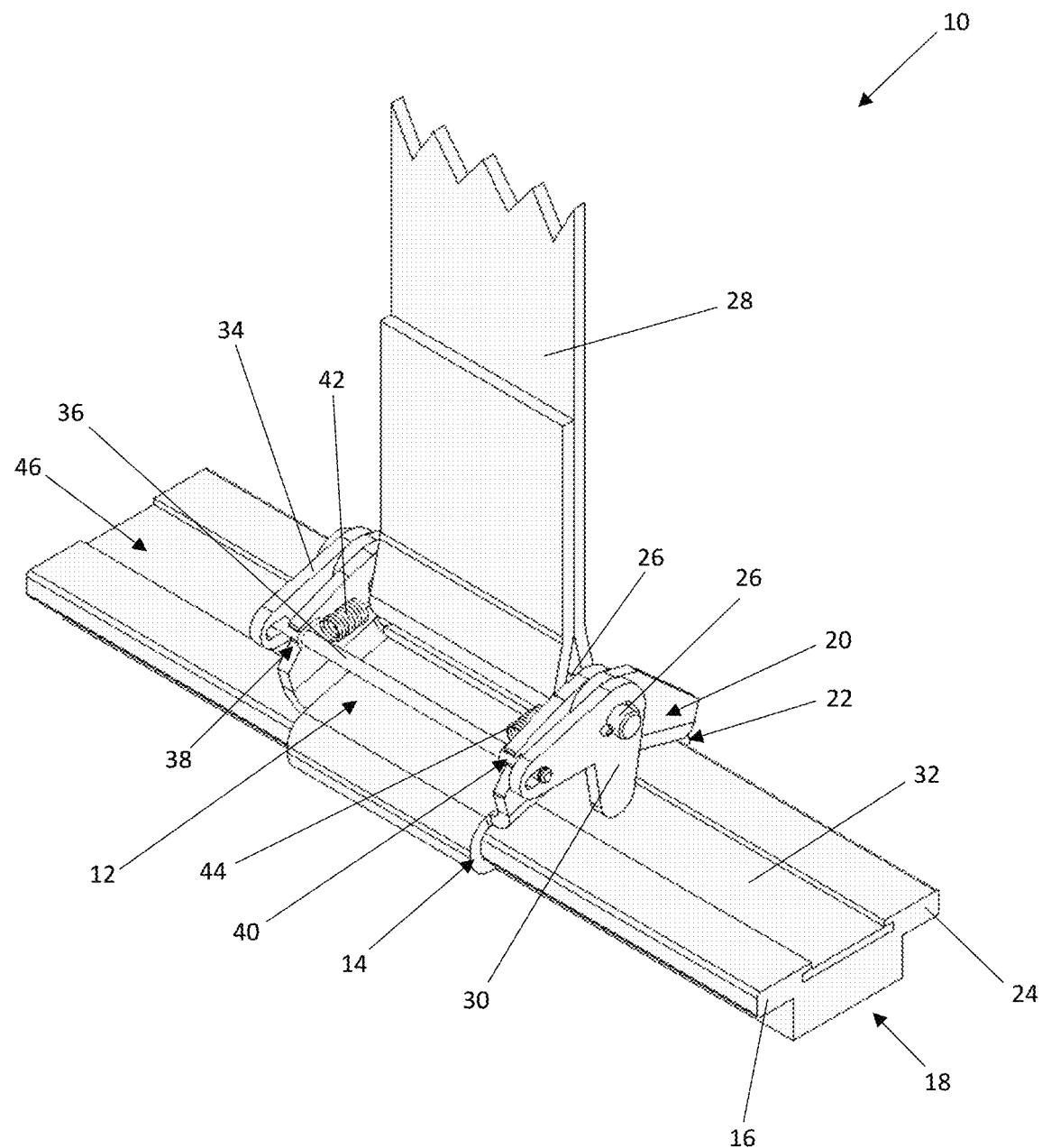
FIG. 1 is a perspective view of a tie down system according to an embodiment of the present invention.
Figure 2:
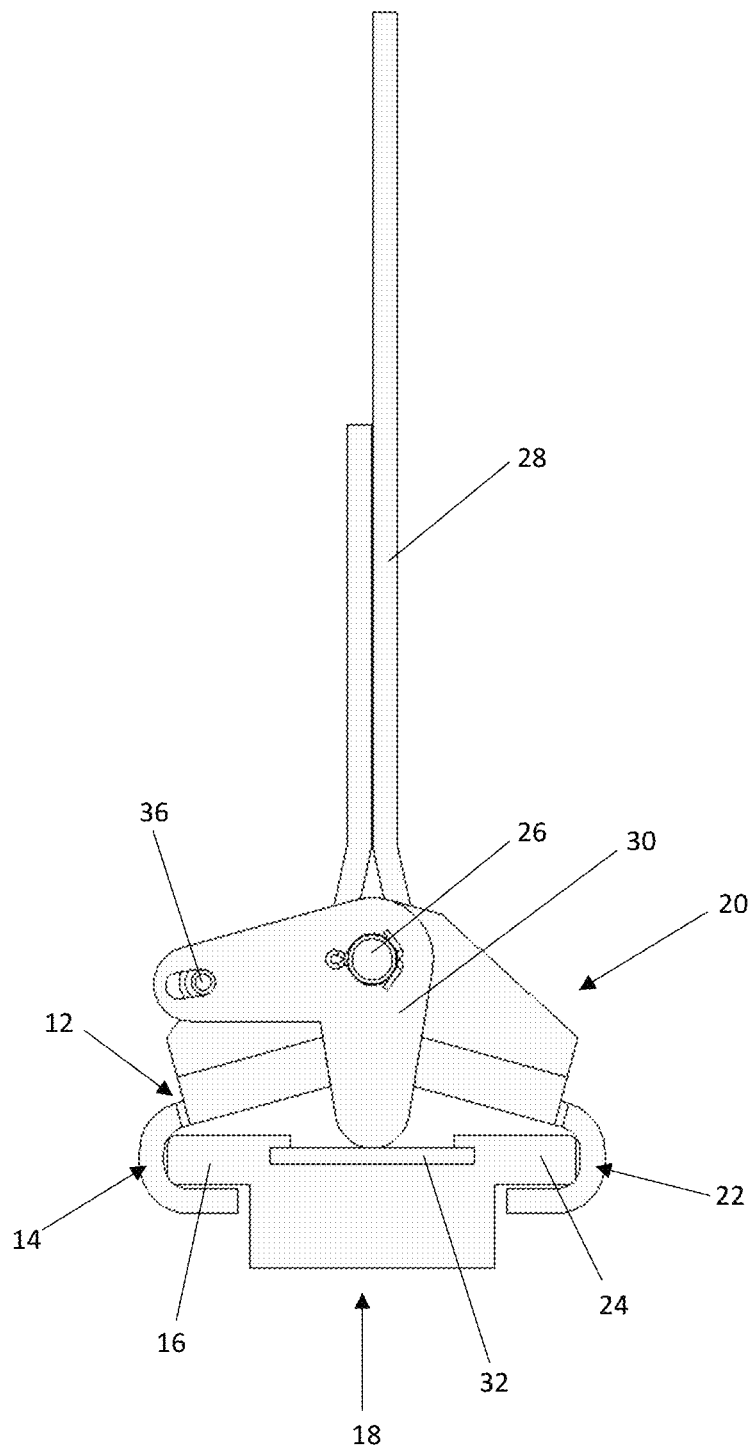
FIG. 2 is an end view of the tie down system of FIG. 1.

With reference to FIGS. 1 and 2 there is shown a tie down system 10 according to an embodiment of the present invention. The tie down system 10 has a first attachment member 12. The first attachment member 12 has an arcuate engagement portion 14 adapted to engage with a flange portion 16 of a track 18.

The tie down system 10 has a second attachment member 20. The second attachment member 20 has an arcuate engagement portion 22 adapted to engage with a flange portion 24 of the track 18. The second attachment member 20 is rotatably attached relative to the first attachment member 12 by a connection portion in the form of a connecting rod 26. A strap 28 is connected to the connecting rod 26.

The first attachment member 12 and the second attachment member 20 are rotatable relative to each other between an engagement position (shown) in which the engagement portions 14,22 engage with the track and inhibit movement of the first attachment member 12 and the second attachment member 20 relative to the track 18, and an open position (not shown) in which the engagement portions 14,22 of the first attachment member 12 and the second attachment member 20 are further apart and the first attachment member 12 and the second attachment member 20 are movable relative to the track 18.

The tie down system 10 has a cam member 30 rotatably attached relative to the first attachment member 12 and the second attachment member 20 by the connecting rod 26. The cam member 30 is rotatable between a biased position (shown) in which the cam member 30 engages with an abutment member 32 of the track 18, and a release position (not shown) in which the cam member 30 disengages from the track 18. In the biased position, the cam member 30 is slightly over centre compared to the pivot point (connecting rod 26), this biases the cam member 30 into the biased position.

In the biased position the cam member 30 biases the first attachment member 12 and the second attachment member 20 to the engagement position. When the cam member 30 is in the release position, the first attachment member 12 and the second attachment member 20 are movable to the open position.

The tie down system 10 has a second cam member 34, which works in a similar manner to the cam member 30. The cam member 30 and the second cam member 34 move together between the biased position and the release position.

A lock bar 36 extends between the cam member 30 and the second cam member 34. The lock bar 36 is movable between a locked position (shown) and an unlocked position (not shown). When the lock bar 36 is in the locked position and when the cam members 30,34 are in the biased position the lock bar 36 engages with notches 38,40 in the first attachment member 12 to secure the cam member 30 and the second cam member 34 in the biased position. The lock bar 36 is biased towards the locked position by springs 42,44, which are connected to the lock bar 36 and the connecting rod 26.

The track 18 has a centrally recessed portion 46 into which the abutment member 32 is located. The abutment member 32 is made of a flexible polypropylene material. The polypropylene material enables the cam member 30 and the second cam member 34 to move over centre relative to the connecting rod 26 and abutment member 32 so that the cam member 30 and the second cam member 34 are biased into the biased position when in the biased position.

ADVANTAGES

An advantage of the preferred embodiment of the tie down system includes easy adjustment of the location of the tie down system along a track. Another advantage of the preferred embodiment of the tie down system includes retaining the tie down system in position when the strap is subject to slack. A further advantage of the preferred embodiment of the tie down system includes the ability to lock the tie down system into an engaged position.

VARIATIONS

While the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A tie down system comprising
a first attachment member having an engagement portion adapted to engage with a portion of a track;
a second attachment member having an engagement portion adapted to engage with a portion of the track, the second attachment member rotatably attached relative to the first attachment member;
a cam member rotatably attached relative to the first attachment member, and rotatable between a biased position in which the cam member engages with a portion of the track and a release position in which the cam member is disengaged from the track; and
a connection portion adapted to connect to a strap,
wherein the first and second attachment members are rotatable relative to each other between an engagement position in which the engagement portions engage with the track and inhibit movement of the first and second attachment members relative to the track, and an open position in which the first and second attachment members are movable relative to the track, and
wherein the cam member in the biased position biases the first and second attachment members to the engagement position, and when the cam member is in the release position, the first and second attachment members are movable to the open position.

2. The tie down system as claimed in claim 1, wherein the engagement portion of the first attachment member is an arcuate portion of the first attachment member, and the engagement portion of the second attachment member is an arcuate portion of the second attachment member.

3. The tie down system as claimed in claim 2, wherein the engagement portions of the first and second attachment members are adapted to engage with opposed flange portions of the track respectively.

4. The tie down system as claimed in claim 1, wherein as the cam moves from the release position to the biased position it moves past an over centre position so that the cam member is biased into the biased position.

5. The tie down system as claimed in claim 1, wherein in the biased position, the cam member is securable to the first attachment member.

6. The tie down system as claimed in claim 1, further comprising a second cam member associated with the cam member, the second cam member also rotatable between a biased position in which the second cam member engages with a portion of the track and a release position in which the second cam member is disengaged from the track, and wherein the second cam member in the biased position biases the first and second attachment members to the engagement position, and when the second cam member is in the release position, the first and second attachment members are movable to the open position.

7. The tie down system as claimed in claim 6, further comprising a lock bar extending between the cam member and the second cam member, the lock bar movable between a locked and unlocked position, and wherein when the cam member and the second cam member are in the biased position and when the lock bar is in the locked position, the lock bar engages with the first attachment member to secure the cam member and the second cam member relative to the first attachment member.

8. The tie down system as claimed in claim 7, wherein the lock bar is biased towards the locked position.

9. The tie down system as claimed in claim 8, wherein the lock bar is biased towards the locked position by one or more springs connected to the lock bar and to the connection member.

10. The tie down system as claimed in claim 1, wherein the connection portion is a connecting rod.

11. The tie down system as claimed in claim 10, wherein at least two of the first attachment member, the second attachment member and the cam member are rotatably attached to the connecting rod.

12. The tie down system as claimed in claim 10, wherein one of the first attachment member, the second attachment member or the cam member is fixedly attached to the connecting rod.

13. The tie down system as claimed in claim 1, wherein the tie down system includes the track.

14. The tie down system as claimed in claim 13, wherein the track includes a centrally recessed portion.

15. The tie down system as claimed in claim 14, wherein an abutment member is located in the recessed portion, and wherein in the biased position, the cam member engages with the abutment member.

16. The tie down system as claimed in claim 15, wherein the abutment member is made of a resilient material.

17. A tie down apparatus comprising
a first attachment member having an arcuate engagement portion adapted to engage with a flange portion of a track;
a second attachment member having an arcuate engagement portion adapted to engage with a flange portion of the track, the second attachment member rotatably attached relative to the first attachment member;

a cam member rotatably attached relative to the first attachment member, and rotatable between a biased position in which the cam member engages with a portion of the track and a release position in which the cam member is disengaged from the track; and a connecting rod adapted to connect to a strap, wherein the first and second attachment members are rotatable relative to each other between an engagement position in which the engagement portions engage with the track and inhibit movement of the first and second attachment members relative to the track, and an open position in which the first and second attachment members are movable relative to the track, and wherein the cam member in the biased position biases the first and second attachment members to the engagement position, and when the cam member is in the release position, the first and second attachment members are movable to the open position, and wherein the first attachment member, the second attachment member and the cam member are rotatably attached to each other by the connection rod.

18. The tie down apparatus as claimed in claim 17, wherein the cam member is securable to the first attachment member in the biased position.

19. A method of securing a strap to a track, comprising the steps of moving a tie down apparatus as claimed in claim 17 along a track to a desired location; and moving the cam member to the biased position to bias the first and second attachment members to the engagement position to inhibit movement of the first and second attachment members relative to the track.

20. The method as claimed in claim 19, further comprising the step of securing the cam member in the biased position to the first attachment member.

* * * * *